(12) United States Patent
Yang

(10) Patent No.: US 8,376,788 B1
(45) Date of Patent: Feb. 19, 2013

(54) ELECTRICAL CONNECTOR HAVING TWO METALLIC PIPES WITH TUBULAR PORTIONS WITH A BAFFLE

(76) Inventor: Chen-Sheng Yang, Kaohsiung (TW)

( * ) Notice: Subject to any disclaimer, the term of this patent is extended or adjusted under 35 U.S.C. 154(b) by 0 days.

(21) Appl. No.: 13/300,273

(22) Filed: Nov. 18, 2011

(51) Int. Cl.
*H01R 24/00* (2006.01)
(52) U.S. Cl. .................................................. 439/699.1
(58) Field of Classification Search ............... 439/699.1, 439/699.2, 669, 682, 692, 696; 362/647, 362/652, 654
See application file for complete search history.

(56) References Cited

U.S. PATENT DOCUMENTS

| | | | | |
|---|---|---|---|---|
| 4,946,406 A | * | 8/1990 | Lane et al. ................. | 439/417 |
| 5,122,081 A | * | 6/1992 | Bogiel et al. ............... | 439/596 |
| 5,288,242 A | * | 2/1994 | Muzslay ..................... | 439/349 |
| 6,200,169 B1 | * | 3/2001 | Tseng ........................ | 439/699.1 |
| 7,125,284 B2 | * | 10/2006 | Ripper et al. ............... | 439/596 |
| 7,896,701 B2 | * | 3/2011 | Pei et al. .................... | 439/619 |
| 7,950,840 B2 | * | 5/2011 | Liu et al. ..................... | 362/654 |
| 8,262,137 B2 | * | 9/2012 | Okuno et al. ............... | 285/86 |
| 2003/0119374 A1 | * | 6/2003 | Wang ........................ | 439/699.1 |
| 2006/0183366 A1 | * | 8/2006 | Ripper et al. ............... | 439/467 |

* cited by examiner

*Primary Examiner* — Chandrika Prasad
(74) *Attorney, Agent, or Firm* — Ming Chow; Sinorica, LLC

(57) ABSTRACT

An electric connector includes a tubular coupler and two metallic pipes mounted in the coupler. Each pipe has a tubular portion, a channel, a baffle sheet and a connecting sheet. The channel is defined through the tubular portion and extending along a longitudinal axis of the tubular portion. The baffle sheet is formed on the pipe and is located on a distal end of the tubular portion to shield the channel and prevent the channel from plugging. The connecting sheet extends from the tubular portion and is located adjacent to the baffle sheet for electrically connecting with an electric conductor.

9 Claims, 4 Drawing Sheets

ELECTRICAL CONNECTOR HAVING TWO METALLIC PIPES WITH TUBULAR PORTIONS WITH A BAFFLE

BACKGROUND OF THE INVENTION

1. Field of the Invention

The present invention relates to a connector, and more particularly to an electric connector.

2. Description of Related Art

A conventional electric connector includes a casing, two metal contacting blades, two metal pipes and two connecting wires. The casing has a cavity defined in the casing, a front end, a rear end being opposite to the front end and a tube formed on the rear end of the casing. The tube has two channels defined in the tube, extending through the tube and communicating with the cavity. The two contacting blades are mounted in the front end of the casing and extend out from the casing for inserting into two insertion slots in an electric socket. The two conducting wires are respectively welded on the two contacting blades and connected to the two pipes for electrically connecting the two contacting blades with the two pipes. The two pipes are respectively received in the two channels in the tube for respectively receiving two metal pins to connect with an electric appliance. The two channels are injected with glue during manufacturing for fixing the two pipes in the two channels. The conventional electric connector is able to be inserted into the electric socket and conduct electric power to the electric appliance.

However, the glue in the two channels sometimes flows into the two pipes and blocks the pipes. Each pipe is filled with glue or an inner periphery of the pipe is attached with the glue such that the two pins are neither inserted into nor electrically connected with the two pipes. Therefore, the conventional connector is short-circuited and is not able to provide a conduction.

To overcome the shortcomings, the present invention tends to provide an electric plug to mitigate or obviate the aforementioned problems.

SUMMARY OF THE INVENTION

The main objective of the invention is to provide an electric connector that includes a tubular coupler and two metallic pipes. The tubular coupler has a front end, a rear end being opposite to the front end and two paths defined through the coupler for communicating the front end with the rear end. The two metallic pipes are respectively disposed in the two paths in the coupler. Each pipe has a tubular portion, a baffle sheet and a connecting sheet. The tubular portion is disposed in a corresponding path in the tubular coupler and has a first end and a second end opposite to the first end. A channel is defined through the tubular portion and extends along a longitudinal axis of the tubular portion for communicating the first end with the second end of the tubular portion. The baffle sheet is formed on the second end of the tubular portion to shield the channel and to prevent the channel from plugging. The connecting sheet extends from the second end of the tubular portion and is located adjacent to the baffle sheet.

Other objects, advantages and novel features of the invention will become more apparent from the following detailed description when taken in conjunction with the accompanying drawings.

DETAILED DESCRIPTION OF PREFERRED EMBODIMENT

Figure 1:
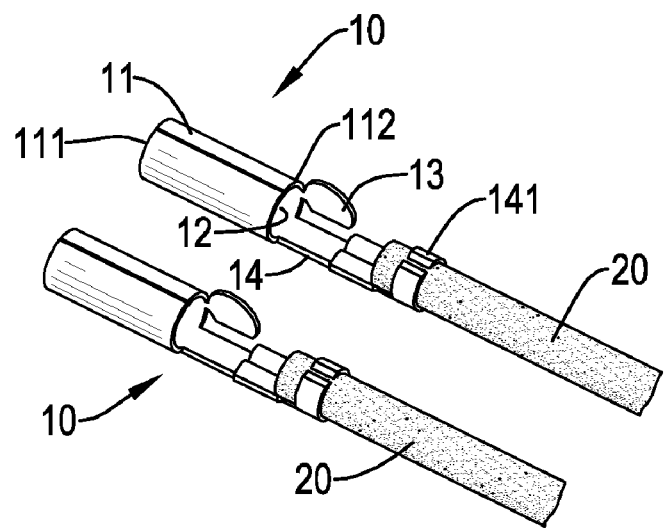
FIG. 1 is a perspective view of two pipes of an electric connector in accordance with the present invention.
Figure 2:
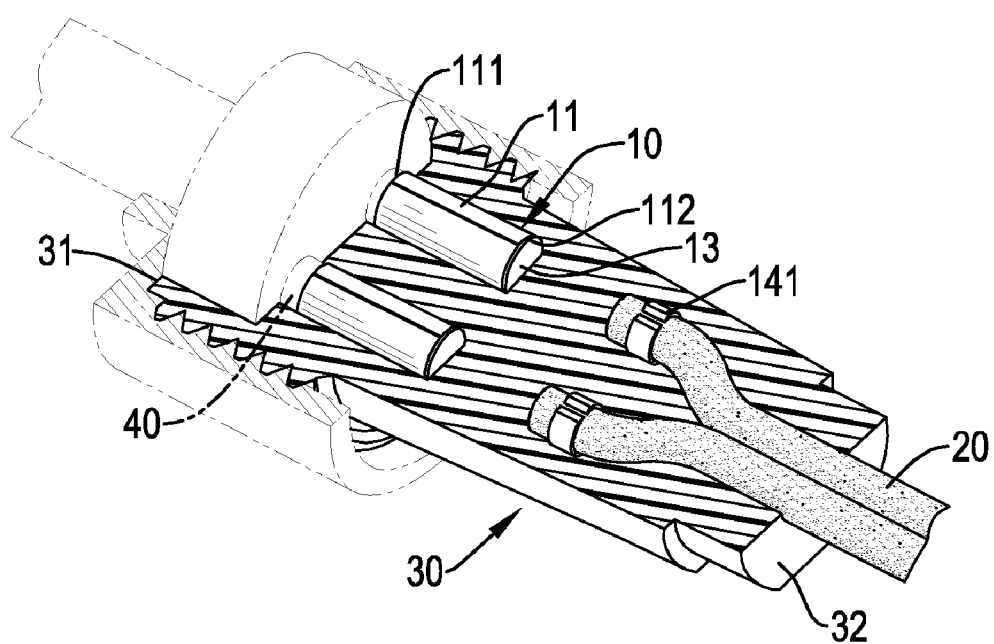
FIG. 2 is a partially perspective view of an electric connector in accordance with the present invention.
Figure 3:
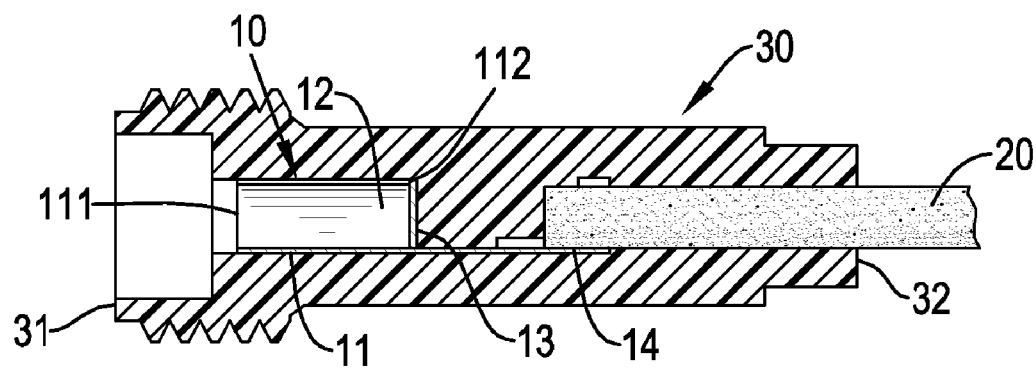
FIG. 3 is a side view in partial section of the electric connector in FIG. 2.

With reference to FIGS. 1 to 3, an electric connector in accordance with the present invention comprises two metallic pipes 10, two conducting wires 20 and a tubular coupler 30.

Each of the two pipes 10 is bended by a single metal sheet and has a tubular portion 11, a channel 12, a baffle sheet 13 and a connecting sheet 14. The tubular portion 11 is curled by the metal sheet to form the channel 12 and has a first end 111 and a second end 112 opposite to the first end 111. The channel 12 is defined through the tubular portion 11 and extends along a longitudinal axis of the tubular portion 11 for communicating the first end 111 with the second end 112 of the tubular portion 11. The baffle sheet 13 is formed on the second end 112 of the tubular portion 11 and is pivotable to shield the channel 12 and to prevent the channel 12 from plugging. The connecting sheet 14 extends from the second end 112 of the tubular portion 11 and is located adjacent to the baffle sheet 13. The connecting sheet 14 has two fixing strips 141 respectively extending from two sides of the connecting sheet 14.

The two conducting wires 20 are respectively electrically connected with the two connecting sheets 14 of the two pipes 10. Each conducting wire is winded by the two fixing strips 141 of a corresponding connecting sheet 14.

The coupler 30 is plastic, is injection molded on and is formed around the two pipes 10 and the two conducting wires 20. The coupler 30 has a front end 31 and a rear end 32 opposite to the front end 31. The two channels 12 in the two first ends 111 of the two pipes 10 communicate with the front end 31 of the coupler 30, and the two conducting wires 20 protrude from the rear end 32 of the coupler 30, such that the two pipes 10 and the two conducting wires 20 in the coupler 30 respectively form two paths defined through the coupler 30 for communicating the front end 31 with the rear end 32 of the coupler 30.

Two metal pins 40 are respectively inserted into the two pipes 10 from the two first ends 111 of the two tubular portions 11 and are electrically connected with the two pipes 10. The two pins 40 are further electrically connected to an electric appliance, such as an illuminator to provide electric power to the electric appliance from the electric connector in accordance with the present invention. When the coupler 30 is manufactured and is injection molded at a high temperature, the plastic material of the coupler 30 is liquefied and is flowable. Due to the non-conductivity of the plastic, the baffle sheet 13 of each pipe 10 shields the channel 12 to prevent the liquefied plastic from flowing into the channel 12, such that the pipe 10 is able to keep a conduction between the tubular portion 11 and a corresponding pin 40.

Figure 4:
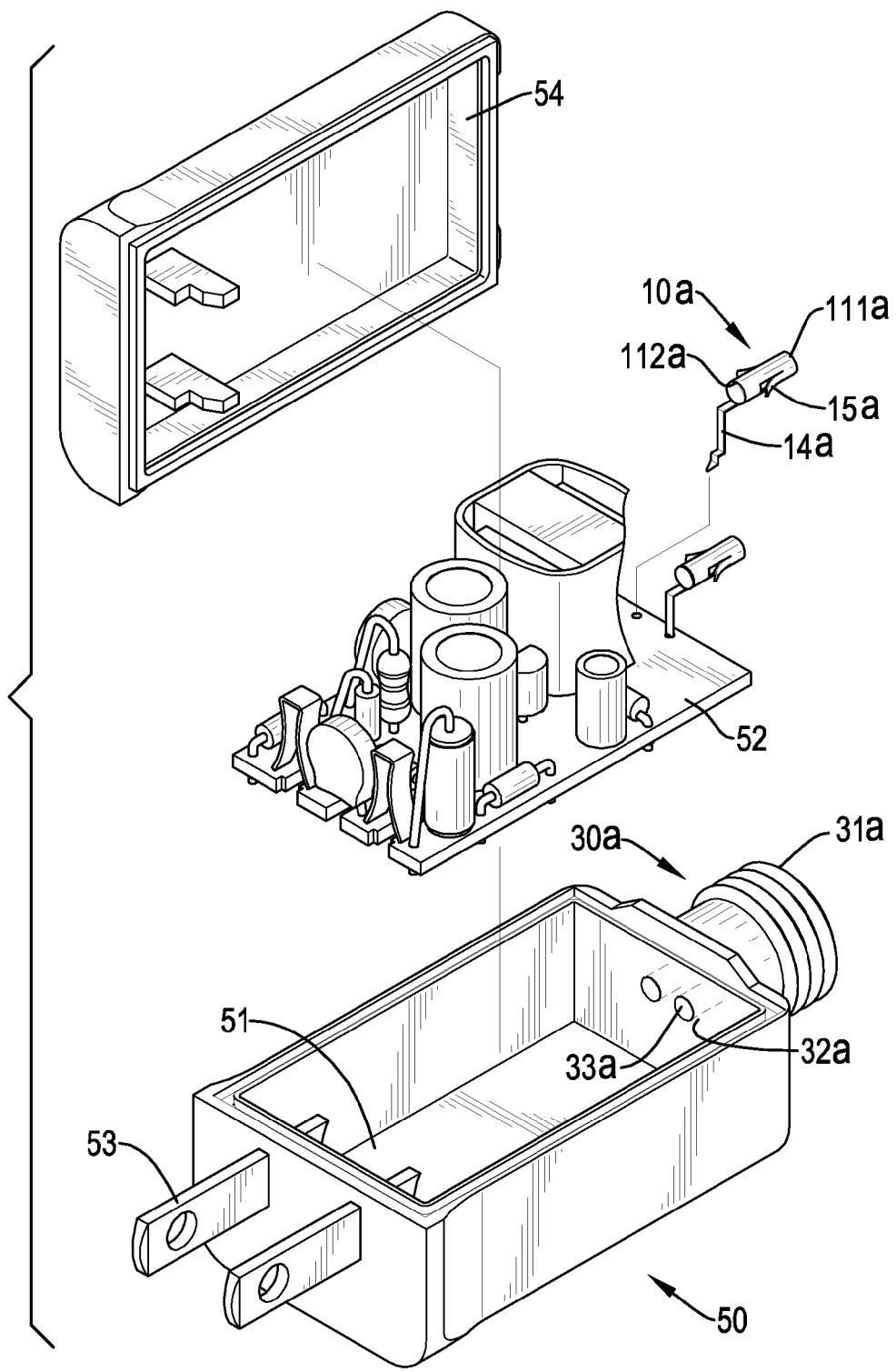
FIG. 4 is an exploded perspective view of a second embodiment of an electric connector in accordance with the present invention.
Figure 5:
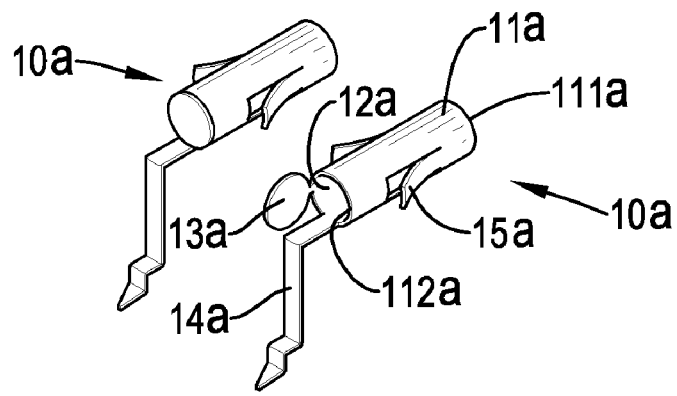
FIG. 5 is a perspective view of two pipes of the second embodiment of the electric connector in FIG. 4.
Figure 6:
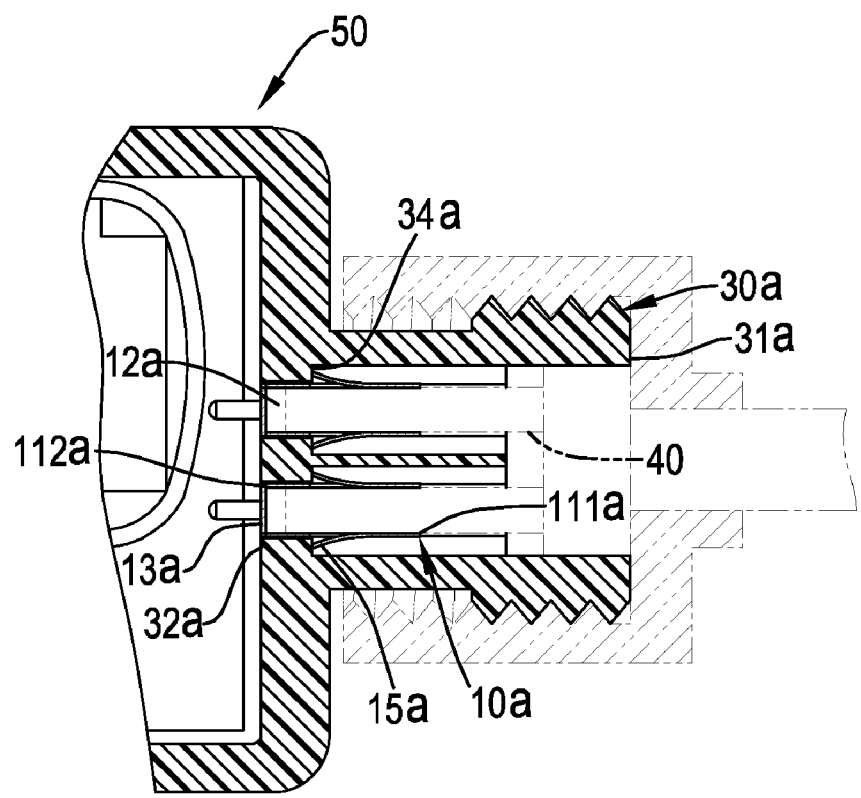
FIG. 6 is a top view in partial section of the second embodiment of the electric connector in FIG. 4.

With reference to FIGS. 4 to 6, in a second embodiment of the electric connector in accordance with the present invention, the elements and effects of the second embodiment are same with the first embodiment except that the coupler 30a is pre-injection molded. The coupler 30a has two paths 33a defined through the casing for communicating the front end 31a of the coupler 30a with the rear end 32a of the coupler 30a. The rear end 32a of the coupler 30a is formed on a casing 50. The casing 50 has a cavity 51, an electric conductor, two conducting blades 53 and a cap 54. The cavity 51 is defined in the casing 50 and communicates with the two paths 33a. Preferably, the electric conductor is a printed circuit board 52. The printed circuit board 52 is received in the cavity 51 in the casing 50. The two conducting blades 53 are mounted through the casing 50 and are electrically connected with the printed circuit board 52. The cap 54 is mounted on the casing 50 to close the cavity 51 in the casing 50. The fixing strips 141 in the first embodiment are omitted and the two connecting sheets 14a of the two pipes 10a are welded on and are electrically connected with the printed circuit board 52. The tubular portion 11a of each pipe 10a has two wings 15a respectively protruding from two sides of the tubular portion 11a. Each wing 15a is elastic and gradually outwardly extends from the first end 111a toward the second end 112a of the pipe 10a. Each path 33a has a shoulder 34a annularly extending from an inner periphery of the path 33a and located adjacent to the rear end 32a. When the two pipes 10a are inserted into the two paths 33a, the two wings 15a of each pipe 10a are elastically deformed and are restored to abut against the shoulder 34a and to prevent the pipe 10a being detached from the rear end 32a of the coupler 30a. The two pins 40 can be inserted respectively into the two channels 12a of the two pipes 10a from the front end 31a of the coupler 30a.

Even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. An electric connector comprising:
   a tubular coupler having
      a front end;
      a rear end being opposite to the front end; and
      two paths defined through the coupler for communicating the front end with the rear end; and
   two metallic pipes respectively disposed in the two paths in the coupler and each pipe having
      a tubular portion disposed in a corresponding path in the tubular coupler and having a first end and a second end opposite to the first end; a channel defined through the tubular portion and extending along a longitudinal axis of the tubular portion for communicating the first end with the second end of the tubular portion;
      a baffle sheet formed on the second end of the tubular portion to shield the channel and to prevent the channel from plugging; and
      a connecting sheet extending from the second end of the tubular portion and located adjacent to the baffle sheet.

2. The electric connector as claimed in claim 1, wherein each pipe has two wings protruding from two sides of the pipe for fixing the pipe in the corresponding path in the coupler.

3. The electric connector as claimed in claim 2, wherein each path has a shoulder annularly extending from an inner periphery of the path and located adjacent to the rear end; each of the two wings is elastic and gradually outwardly extends from the first end toward the second end of the pipe to abut against the shoulder and to prevent the pipe being detached from the rear end of the tubular coupler.

4. The electric connector as claimed in claim 3, wherein the rear end of the coupler is connected with a casing; the casing has a cavity, an electric conductor, two conducting blades and a cap; the cavity is defined in the casing and communicates with the two paths in the tubular coupler; the electric conductor is received in the cavity in the casing; the two conducting blades are mounted through the casing and are electrically connected with the electric conductor; the cap is mounted on the casing to close the cavity in the casing; the two connecting sheets of the two pipes are welded on and are electrically connected with the electric conductor.

5. The electric connector as claimed in claim 2, wherein the rear end of the coupler is connected with a casing; the casing has a cavity, an electric conductor, two conducting blades and a cap; the cavity is defined in the casing and communicates with the two paths in the tubular coupler; the electric conductor is received in the cavity in the casing; the two conducting blades are mounted through the casing and are electrically connected with the electric conductor; the cap is mounted on the casing to close the cavity in the casing; the two connecting sheets of the two pipes are welded on and are electrically connected with the electric conductor.

6. The electric connector as claimed in claim 1, wherein the rear end of the coupler is connected with a casing; the casing has a cavity, an electric conductor, two conducting blades and a cap; the cavity is defined in the casing and communicates with the two paths in the tubular coupler; the electric conductor is received in the cavity in the casing; the two conducting blades are mounted through the casing and are electrically connected with the electric conductor; the cap is mounted on the casing to close the cavity in the casing; the two connecting sheets of the two pipes are welded on and are electrically connected with the electric conductor.

7. The electric connector as claimed in claim 1, wherein the two connecting sheets of the two pipes are respectively electrically connected with two conducting wires; the tubular coupler is injection molded on the two pipes and the two conducting wires; the two channels in the first ends of the two pipes communicate with the front end of the tubular coupler and the two conducting wires protrude from the rear end of the tubular coupler.

8. The electric connector as claimed in claim 7, wherein each of the two connecting sheets has two fixing strips respectively extending from two sides of the connecting sheet for winding on and electrically connecting to a corresponding conducting wire.

9. The electric connector as claimed in claim 1, wherein each of the two connecting sheets has two fixing strips respectively extending from two sides of the connecting sheet.

* * * * *